US008732507B2

(12) United States Patent  
Beckhoff et al.

(10) Patent No.: US 8,732,507 B2
(45) Date of Patent: May 20, 2014

(54) CIRCUIT AND METHOD FOR AN UNINTERRUPTIBLE POWER SUPPLY OF ELECTRONIC DEVICES HAS A CHANGEOVER SWITCH TO SUPPLY POWER FROM DIFFERENT POWER SOURCES ACCORDING TO VARIOUS PREDEFINED POWER DROP CONDITIONS

(75) Inventors: Hans Beckhoff, Verl (DE); Andreas Thome, Langenberg (DE)

(73) Assignee: Beckhoff Automation GmbH, Verl (DE)

( * ) Notice: Subject to any disclaimer, the term of this patent is extended or adjusted under 35 U.S.C. 154(b) by 282 days.

(21) Appl. No.: 13/253,357

(22) Filed: Oct. 5, 2011

(65) Prior Publication Data

US 2012/0089855 A1    Apr. 12, 2012

Related U.S. Application Data

(63) Continuation of application No. PCT/EP2010/053088, filed on Mar. 11, 2010.

(30) Foreign Application Priority Data

Apr. 6, 2009  (DE) .......................... 10 2009 002 202

(51) Int. Cl.
*G06F 1/00*    (2006.01)
(52) U.S. Cl.
USPC .......................................................... 713/340
(58) Field of Classification Search
None
See application file for complete search history.

(56) References Cited

U.S. PATENT DOCUMENTS

| 5,818,125 | A | 10/1998 | Manchester |
| 5,880,951 | A | 3/1999 | Inaba |
| 7,139,937 | B1* | 11/2006 | Kilbourne et al. ........... 714/47.2 |
| 2002/0049917 | A1 | 4/2002 | Portman et al. |
| 2004/0090774 | A1* | 5/2004 | Hsueh ........................... 362/183 |
| 2008/0155294 | A1* | 6/2008 | Kikuchi et al. ................ 713/340 |
| 2010/0079116 | A1* | 4/2010 | Thivierge et al. ............. 320/153 |
| 2010/0169031 | A1* | 7/2010 | Dishman et al. ................. 702/60 |

FOREIGN PATENT DOCUMENTS

| AT | 411412 B | 12/2003 |
| DE | 10 2005 023 486 A1 | 11/2006 |
| WO | WO 2063741 A2 * | 8/2002 ................ H02J 7/00 |

OTHER PUBLICATIONS

Drew, Jim "Replace Batteries in Power Ride-Through Applications with Robust Supercaps and 3mm x 3mm Capacitor Charger" Linear Technology Magazine, Sep. 2008 vol. XVIII No. 3, 3 pages http://cds.linear.com/docs/LT%20Journal/LTMag-V18N03-01-LTC3225-JimDrew.pdf.
Guerrero et al. "Uninterruptible Power Supply System Provide Protection" IEEE Industrial Electronics Magazine. Spring 2007. pp. 29-38.

* cited by examiner

*Primary Examiner* — Thomas Lee
*Assistant Examiner* — Zhipeng Wang
(74) *Attorney, Agent, or Firm* — Dorsey & Whitney LLP

(57) ABSTRACT

A circuit for uninterruptible power supply, wherein the circuit can be connected to an energy supply and a load and includes a capacitive energy store, a changeover switch, a charging device, a charging control device, a voltage monitoring device, and a discharge device.

24 Claims, 2 Drawing Sheets

CIRCUIT AND METHOD FOR AN UNINTERRUPTIBLE POWER SUPPLY OF ELECTRONIC DEVICES HAS A CHANGEOVER SWITCH TO SUPPLY POWER FROM DIFFERENT POWER SOURCES ACCORDING TO VARIOUS PREDEFINED POWER DROP CONDITIONS

CROSS-REFERENCE TO RELATED APPLICATIONS

This application is a continuation of International Patent Application No. PCT/EP2010/053088, filed on Mar. 11, 2010, which claims priority to German Patent Application No. 10 2009 002 202.3-34, filed on Apr. 6, 2009, the entire contents of both of which are incorporated herein by reference.

BACKGROUND

The invention relates to a circuit and a method for the uninterruptible power supply of electronic modules comprising a capacitive energy store, in particular for use in a computer system.

The undesired interruption of the supply of energy in computer systems, even when it is in the region of a few milliseconds, generally suffices to destroy the functioning of the computer system. In the case of computer systems, it is necessary here, in order to carry out a controlled switch-off process in which a loss of important computer data is avoided, to bridge the failure of the regular supply of energy for the time period required for properly shutting down the computer system with the aid of an uninterruptible power supply. In this bridging time, the computer system can then close open files, e.g. sensitive databases, and save important computer data in nonvolatile read only memories.

Uninterruptible power supplies such as are also used, in particular, in computer systems generally comprise rechargeable batteries as energy stores. However, such rechargeable batteries have a high charging time. Furthermore, the current intensity is limited in the case of rechargeable batteries. In the case of computer systems, in particular for use in automation technology, it is preferred to design the uninterruptible power supply as a plug-in card or as part of the motherboard of the computer. However, rechargeable batteries as energy stores have a high space requirement, such that uninterruptible power supplies having rechargeable batteries can be incorporated in computer systems only with difficulty.

Since, in the case of computer systems, generally only interruptions in the regular supply of energy of a few seconds have to be bridged, because this holding time usually suffices for a controlled switch-off of the computer system, use is increasingly being made of capacitive energy stores with which high current intensities can be obtained for a short time and which are distinguished by a small space requirement. So-called double-layer capacitor, having a high efficiency and a long life time, are appropriate as capacitive energy stores for use in an uninterruptible power supply.

One important requirement made of an uninterruptible power supply having a capacitive energy store, primarily when used in computer systems, is rapid starting, in order, in the case of a collapse of the regular supply of energy, to reliably ensure the controlled shutdown or saving of important computer data. When a capacitive energy store is used, it is generally necessary to adapt the voltage specified by storage elements of the uninterruptible power supply to the supply voltage of the computer. Furthermore, when a capacitive energy store is used, it is necessary to ensure that uniform charging or discharging of the individual elements takes place in order to avoid damage or destruction of the capacitive energy store. Furthermore, the uninterruptible power supply, particularly when it is used in a computer system, has to be designed such that a faulty charging or discharging process and a defective capacitive energy store are reliably ascertained.

SUMMARY

Various aspects of the present invention provide an improved circuit and a improved method for the uninterruptible power supply of electronic modules with the aid of a capacitive energy store which are able to be adapted in a simple manner to supply voltages, desired holding times and communication protocols of the connected main system to be supplied with energy and ensure a reliable and rapid-reaction bridging of the interruptions of the regular supply of energy.

In one embodiment, the invention comprises a circuit for providing an uninterruptible power supply, wherein the circuit can be connected to an energy supply and a load, and comprises a capacitive energy store, a changeover switch, a charging device, a charging control device, a voltage monitoring device, and a discharge device.

In one embodiment, the invention comprises a circuit and method for providing an uninterruptible power supply, wherein the circuit can be connected to an energy supply and a load and comprises a capacitive energy store connected to the energy supply and a changeover switch connected to the energy supply and the capacitive energy store, said changeover switch being designed, if a first predetermined voltage drop occurs when a voltage is applied via the energy supply, to change over from supplying the load with energy via the energy supply to supplying the load with energy from the capacitive energy store. The circuit further comprises a charging device connected between the energy supply and the capacitive energy store and serving for charging the capacitive energy store. The circuit further comprises a charging control device connected to the capacitive energy store and the charging device, said charging control device being designed to monitor the capacitive energy store by evaluating a voltage of the capacitive energy store and to switch off the charging device when a fault is ascertained. The circuit further comprises a voltage monitoring device connected to the energy supply and serving for determining and signaling in the form of a fault signal if a second predetermined voltage drop occurs when the voltage is applied via the energy supply, said second predetermined voltage drop being less than the first predetermined voltage drop. The circuit further comprises a discharge device connected between the capacitive energy store and the changeover switch and connected to the voltage monitoring device, said discharge device being designed, when the fault signal of the voltage monitoring device is present, to make available to the changeover switch the energy required for supplying the load by means of discharging the capacitive energy store.

An embodiment of the present invention provides a circuit for uninterruptible power supply, which can be connected to an energy supply and a load. The circuit comprises a capacitive energy store connected to the energy supply. The circuit further comprises a changeover switch connected to the energy supply and the capacitive energy store, said changeover switch being designed, if a first predetermined voltage drop occurs when a voltage is applied via the energy supply, to change over from supplying the load with energy via the energy supply to supplying the load with energy from the capacitive energy store. The circuit further comprises a charging device connected between the energy supply and the capacitive energy store and serving for charging the capacitive energy store. The circuit further comprises a charging control device connected to the capacitive energy store and the charging device, said charging control device being designed to monitor the capacitive energy store by evaluating a voltage of the capacitive energy store and to switch off the charging device when a fault is ascertained. The circuit further comprises a voltage monitoring device connected to the energy supply and serving for determining and signaling in the form of a fault signal if a second predetermined voltage drop occurs when the voltage is applied via the energy supply, said second predetermined voltage drop being less than the first predetermined voltage drop. The circuit further comprises a discharge device connected between the capacitive energy store and the changeover switch and connected to the voltage monitoring device, said discharge device being designed, when the fault signal of the voltage monitoring device is present, to make available to the changeover switch the energy required for supplying the load by means of discharging the capacitive energy store.

Another embodiment of the present invention provides a method for the uninterruptible power supply of a load. wherein a capacitive energy store connected to an energy supply is charged, wherein the charging of the capacitive energy store is monitored by the evaluation of a voltage of the capacitive energy store and is terminated when a fault is ascertained, wherein, if a first predetermined voltage drop occurs when a voltage is applied via the energy supply, an energy required for supplying the load is made available by the discharging of the capacitive energy store, and wherein, if a second predetermined voltage drop occurs when the voltage is applied via the energy supply, said second predetermined voltage drop being greater than the first predetermined voltage drop, a changeover is made from supplying the load with energy via the energy supply to supplying the load with energy from the capacitive energy store.

Another embodiment of the present invention provides a motherboard comprising a power supply unit, a main processor and a circuit arranged between the power supply unit and the main processor. The circuit comprises a capacitive energy store and a changeover switch connectable to the energy supply unit and the main processor, said changeover switch being connected to the capacitive energy store and designed to change over from supplying the main processor with energy via the energy supply unit to supplying the main processor with energy from the capacitive energy store if a first predetermined voltage drop occurs when a voltage is applied via the energy supply unit. The circuit further comprises a charging device connectable to the energy supply unit, said charging device being connected to the capacitive energy store and designed to charge the capacitive energy store. The circuit further comprises a charging control device connected to the capacitive energy store and the charging device, said charging control device being designed to monitor the capacitive energy store by evaluating a voltage of the capacitive energy store and to switch off the charging device when a fault is ascertained, a voltage monitoring device connectable to the energy supply unit, said voltage monitoring device being designed to determine and signal in the form of a fault signal if a second predetermined voltage drop occurs when the voltage is applied via the energy supply unit, said second predetermined voltage drop being less than the first predetermined voltage drop. The circuit further comprises a discharge device connected between the capacitive energy store and the changeover switch and connected to the voltage monitoring device, said discharge device being designed, when the fault signal of the voltage monitoring device is present, to change from a standby mode or off mode into an active mode in order to make available to the changeover switch the energy required for supplying the main processor by means of discharging the capacitive energy store.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The uninterruptible power supply according to the invention will be explained on the basis of the example of use in a computer system and in this case as part of a motherboard comprising a main processor. The bridging time required for a controlled shutdown in the case of computer systems is generally in the seconds range, such that the uninterruptible power supply according to the invention is designed for a corresponding holding time. However, there is the possibility of using the uninterruptible power supply according to the invention also for other loads connected downstream, with longer or shorter holding times required therefor, instead of for a computer system.

Figure 1:
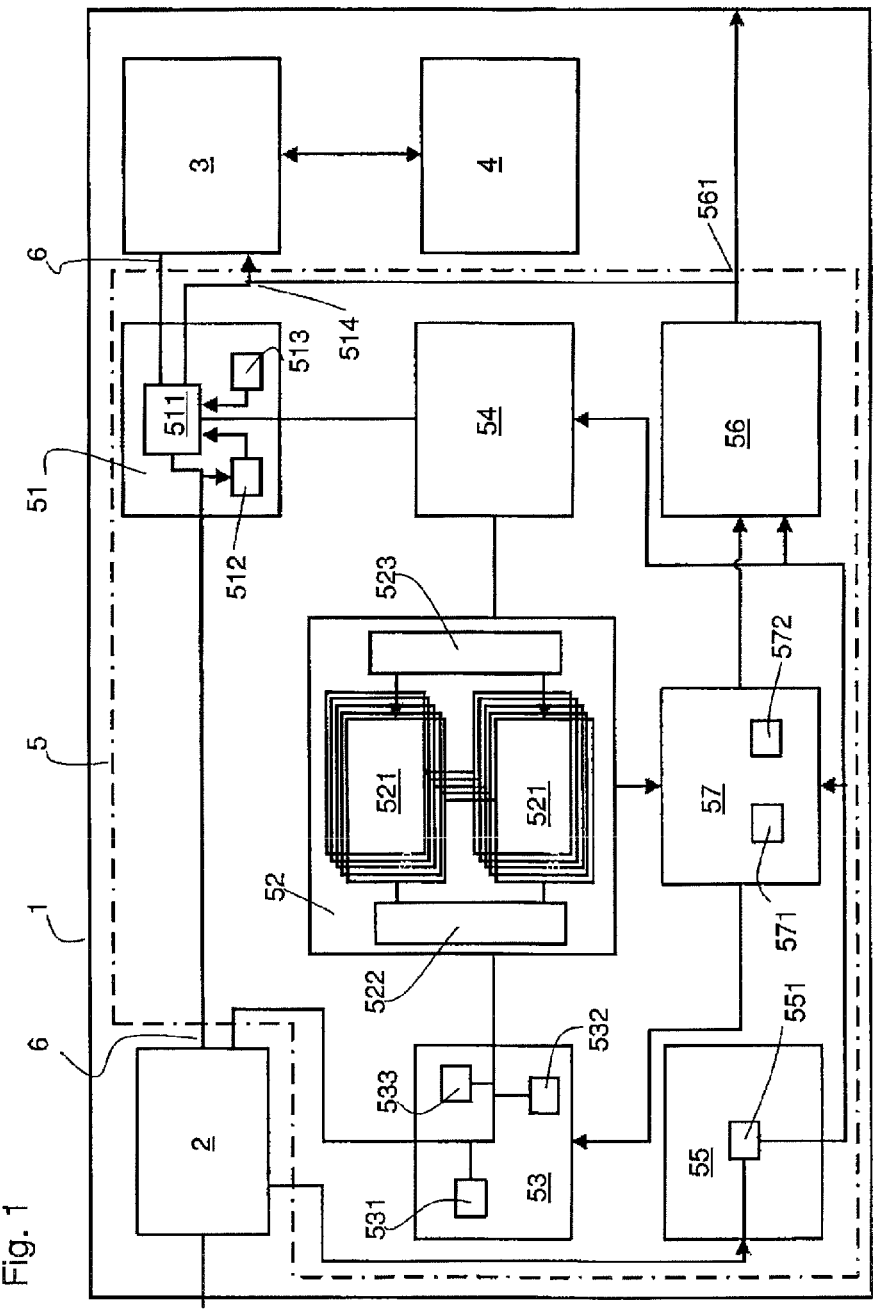
FIG. 1 shows a block diagram of an uninterruptible power supply.

FIG. 1 shows a motherboard 1 equipped with a power supply unit 2, a main processor 3, a memory 4 and an uninterruptible power supply 5. In this case, the power supply unit 2 supplies the main processor 3 with energy via a supply line 6, into which the uninterruptible power supply 5 is interposed. The uninterruptible power supply 5 shown in FIG. 1 is designed to keep alive the main processor 3 connected downstream for a short period of time of a few seconds after the failure of the regular voltage supply by the power supply unit 2, in order that the main processor 3 can shut down in a controlled manner and in this case save important processor data e.g. from a volatile working memory into the nonvolatile memory 4. Further components, e.g. a BIOS chip, interface components, and expansion cards such as a graphics card, a sound card or a network card, can be mounted on the motherboard 1. These further components are generally connected to the power supply unit 2 in a similar manner to the main processor 3 via the uninterruptible power supply 5 for the supply of energy. However, there is also the possibility that, if the further components are not critical loads whose supply of energy has to be ensured in a manner free of fluctuations in the event of disturbance in the electrical power grid, said components are connected directly to the power supply unit 2 whilst bypassing the uninterruptible power supply.

The power supply unit 2 can also be embodied as a separate component, as an alternative, instead of on the motherboard 1. In the case of computers, the power of the power supply unit 2 is usually between 200 W and 600 W, but can also be significantly higher depending on the requirement. The power supply unit 2 can furthermore be designed such that it can be operated with different voltages. In this case, the changeover between the different voltages can be effected manually or automatically. Thus, computer power supply units can be operated e.g. with a power supply AC voltage of between 100 V and 250 V or e.g. with a 24 V DC voltage. The power supply unit 2 is furthermore generally designed as an AC/DC converter and can supply different output voltages, e.g. 12 V for graphics cards and drives, 5 V for the main processor and external connections and 3.3 V for the memory.

A changeover switch 51 of the uninterruptible power supply is arranged in the supply line 6 between the power supply unit 2 and the downstream supply-critical loads, the main processor 3 in FIG. 1. The changeover switch 51 has a power switch 512, which in normal operation, in the case of disturbance-free power supply by the power supply unit 2, switches the power of the power supply unit through to the downstream main processor 3. However, if the desired supply voltage of the main processor 3 on the supply line 6 from the power supply unit 2 falls below a predetermined threshold value, the changeover switch 51 changes over to a supply of energy for the main processor 3 by the uninterruptible power supply 5.

For this purpose, the changeover switch 51 has a comparator 512, which samples the voltage on the supply line 6 corning from the power supply unit 2 and compares with the stored threshold value and, when the supply voltage falls below the threshold value, triggers a corresponding fault signal, which then causes the power switch 511 in the changeover switch 51 to change over from supply of energy by the power supply unit 2 to supply of energy by the uninterruptible power supply 5. In this case, the comparator 512 in the changeover switch 51 is designed such that, as soon as the supply voltage supplied by the power supply unit 2 exceeds the predetermined threshold value again, it switches back from the supply of energy for the main processor 3 by the uninterruptible power supply 5 to the supply of energy by the power supply unit 2.

The changeover switch 51 furthermore has a blocking device 513, which prevents a supply of energy from the uninterruptible power supply 5 into the power supply unit 2 and thus into the electrical power grid. This feedback-resistant design of the changeover switch 51 ensures that a power loss during the supply of the load via the uninterruptible power supply is prevented. The power switch 511 in the changeover switch 51 furthermore generates a status signal, which indicates to the connected load, the main processor 3 in FIG. 1, via a data interface 514, whether the supply of energy is effected via the power supply unit 2 or by the uninterruptible power supply 5.

The central component of the uninterruptible power supply 5 is a capacitive energy store 52. Capacitive energy stores are distinguished by little self-discharge and energy storage without the chemical conversion process, as a result of which a high efficiency and a long lifetime can be achieved. The capacitive energy store 52 is preferably composed of a combination of capacitive storage cells 521. In this case, primarily so-called double-layer capacitors, distinguished by a small space requirement, a long lifetime and little self-discharge, are suitable as capacitive storage cells. Through suitable interconnection of the capacitive storage cells 521 in the form of series and/or parallel circuits, as illustrated schematically in FIG. 1, there is the possibility of setting the desired power parameters, in particular the holding time and the power output. It is thus possible to set holding times between several seconds, such as generally suffices for an uninterruptible power supply for bridging a power failure in the case of the main processor 3 shown in FIG. 1, in order that said main processor can be switched off in a controlled manner, and tens of minutes in order to ensure the supply of critical electrical loads e.g. in automation systems.

A compensation circuit 522 is connected upstream of the combination of capacitive storage cells 521, said compensation circuit providing for uniform charging of the capacitive storage cells 521, that is to say ensuring that the same voltage is applied to all the capacitive storage cells 521 during charging in order to be able to fully charge the capacitive storage cell. When different charging voltages are applied to the capacitive storage cells 521, there is the risk of individual storage cells being overcharged, which can then lead to destruction of said storage cell. In this case, the compensation circuit 522 is designed such that it compensates for the internal resistances of the storage cells 521 which are generally slightly different in a manner governed by production, in order to provide for an identical charging voltage at the individual storage cells.

The capacitive energy store 52 furthermore has an exchange device 523, hereinafter also called hot plug circuit, which makes it possible to change or switch on or off individual capacitive storage cells 521 during normal operation of the uninterruptible power supply, when the supply of energy is effected via the power supply unit. The hot plug circuit 523 is therefore suitable, in particular, for use in a capacitive energy store 52 with storage cells connected in parallel. With the hot plug circuit 523, individual storage cell branches can then be disconnected or added. The hot plug circuit 523 thus makes it possible, even in the course of operation, e.g. if the uninterruptible power supply is used in the context of an automation system as control computer, to exchange faulty capacitive storage cells or else to adapt the uninterruptible power supply flexibly to altered conditions of use, e.g. lengthened holding time.

A charging device 53 for charging the capacitive storage cells of the energy store 52 via the power supply unit 2 is connected upstream of the capacitive energy store 52 in the uninterruptible power supply. The charging device 53 is preferably a feedback-resistant voltage and current regulator, which adapts the supply voltage of the power supply unit 2 to the charging voltage of the capacitive storage cell 521. In this case, the voltage and current regulator 53 is designed as a so-called step-up regulator if the supply voltage of the power supply unit 2 has to be raised for charging the capacitive storage cell 521, as a step-down regulator if the supply voltage of the power supply unit 2 is higher than the charging voltage of the capacitive storage cells 521, or as a Sepic converter if the supply voltage of the power supply unit 2 can be both greater and less than the charging voltage of the capacitive storage cells 521. As a result of this voltage adaptation of the supply voltage to the charging voltage of the capacitive energy store with the aid of the charging device 53, the uninterruptible power supply can be operated flexibly and simply with different supply voltages of the energy supply.

The feedback-resistant design of the charging device 53 is achieved with a blocking device 531, which prevents energy from the capacitive energy store 52 from flowing back into the power supply unit 2 or the energy supply. The charging device 53 furthermore has a voltage and current limiter 532 in order to ensure a gentle charging process of the capacitive energy store 52, whereby a lengthened lifetime of the capacitive energy store is achieved. Furthermore, a power consumption limiter 533 is preferably also provided in the charging device 53, said power consumption limiter protecting the supplying power supply unit 2 against overload and hence the load connected downstream against instabilities in the supply of energy.

Furthermore, a discharge device 54 is arranged between the capacitive energy store 52 and the changeover switch 51, said discharge device in turn being designed as step-up, step-down or Sepic-enabled voltage converter, depending on whether the supply voltage for the load connected downstream, the main processor 3 in FIG. 1, if the load is supplied via the uninterruptible power supply, is higher or lower than the voltage supplied by the capacitive energy store or the voltage supplied by the capacitive energy store is either greater or less than the supply voltage of the load.

The discharge device 54 applies the voltage supplied by the capacitive energy store 52 to the power switch 511 of the changeover switch 51, which then switches said voltage, after the changeover from the supply of energy via the power supply unit 2 to the uninterruptible power supply 5, through to the downstream load and thus supplies the load with energy until the capacitive energy store 52 is discharged. In this case, the discharge device 54 is designed such that in normal operation, if the load is supplied via the power supply unit 2 and the uninterruptible power supply 5 is not active, the discharge device 54 is switched off or is in standby operation, which achieves the effect that the discharge device 54 in normal operation draws as little energy as possible from the capacitive energy store 52. Thus, undesirable constant recharging of the capacitive energy store is prevented, which provides for a lengthened lifetime of the capacitive energy store 52 since the capacitive energy stores generally withstand only a limited number of charging and discharging cycles.

In order to achieve a high reaction speed of the uninterruptible power supply upon the collapse of the regular supply of energy via the power supply unit 2, as is required in particular in the case of use as bridging of the supply of energy for a main processor 3, in which even small fluctuations in the voltage supply can lead to a crash and hence a data loss, a voltage monitoring device 55 is provided, which permanently monitors the voltage on the supply line 6 or in the power supply unit 2. In this case, the voltage monitoring device 55 generally taps off the applied supply voltage upstream of the power supply unit 2 directly at the energy supply. However, if the supply voltage is an AC voltage that is converted into a DC voltage in the power supply unit 2, the supply voltage is monitored downstream of the power supply unit 2. If no power supply unit is present and the supply voltage for the downstream load is supplied externally, the supply voltage is measured at the supply point.

The voltage monitoring device 55 has a comparator 551, which compares the measured supply voltage with a threshold value and triggers a fault signal if the voltage value falls below said threshold value. This second threshold value has a smaller difference with respect to the desired value than the first threshold value predetermined for the changeover switch 51, such that the voltage monitoring device 55 already signals a fault in the regular supply of energy before the changeover switch 51 changes over from the supply voltage supplied by the power supply unit to the uninterruptible power supply. As an alternative to a threshold value comparison, the comparator 551 of the voltage monitoring device 55 can also be designed, if a drop in the supply voltage is ascertained, to trigger a fault signal, wherein the voltage monitoring device 55 has already sent the fault signal before the drop—ascertained by the changeover switch—in the supply voltage has led to the changeover process from the normal supply of energy to the uninterruptible power supply.

The voltage monitoring device 55 applies the fault signal to the discharge device 54, whereupon the latter undergoes transition from the off or standby mode to the active mode and applies the voltage supplied by the capacitive energy store 52 immediately to the changeover switch 51. This procedure ensures that the voltage of the capacitive energy store 52 of the uninterruptible power supply is already present at the changeover switch before the actual changeover process from the regular supply of energy to the uninterruptible power supply and, consequently, a fluctuation-free transition during changeover is ensured, which then provides for a reliable supply of energy for the downstream load.

The uninterruptible power supply furthermore has a status monitoring device 56, preferably a microcontroller, which is connected to the voltage monitoring device 55. The voltage monitoring device 55 communicates the fault signal to the status monitoring device 56 if a disturbance is ascertained in the normal supply of energy. The status monitoring device 56 serves for the external communication of the uninterruptible power supply and has for this purpose, as shown in FIG. 1, a corresponding data interface 561 for tapping externally. In particular, however, the status monitoring device 56 connects the uninterruptible power supply to the downstream loads, here the main processor 3, in order that an imminent collapse in the regular supply of energy is already signaled to the load early. The status monitoring device 56 can furthermore have further functions, such as a counter of total operating hours, a counter of operating hours, a temperature measuring device, etc., in order to carry out a functional monitoring of the uninterruptible power supply. In particular, there is the possibility of designing the status monitoring device 56 such that ambient variables such as the operating temperature on the motherboard, in the case of the activation of the uninterruptible power supply, are determined in order then to make these data available for subsequent read-out via the interface externally in a memory in order then to be able to determine there from e.g. the reason for the collapse of the regular supply of energy.

The status monitoring device 56 can furthermore be designed, via a corresponding control device, if a fault signal from the voltage monitoring device 55 is present, to switch off individual load components connected downstream according to an envisaged time schedule, in order thus to ensure that only supply-critical loads are supplied upon the activation of the uninterruptible power supply, in order to avoid unnecessary loading of the uninterruptible power supply and to achieve longer holding times. As a result of the early signaling of a collapse of the regular supply of energy before a changeover is made to the uninterruptible power supply, the main processor 3 can already start early with a controlled shutdown for saving important data in the read only memory 4, as a result of which increased security against data losses is achieved.

The uninterruptible power supply 5 furthermore has a charging control device 57 connected to the capacitive energy store 52 and the charging device 33. The charging control device 57, preferably a microcontroller, is designed to monitor the charge state of the capacitive energy store 52 by evaluating the voltage of the capacitive energy store and to switch off the charging device 53 when a fault is ascertained.

If the charging control device 57 in this case registers a voltage drop at a storage cell 521 of the capacitive energy store 52, that is to say that the voltage at said storage cell falls below the voltage at the further storage cells and an unbalance of the voltages present at the individual storage cells 521 thus occurs, the charging control device 57 ensures that the further charging process via the charging device 53 is ended in order to prevent destruction of the other storage cells by overcharging.

The charging control device 57 is furthermore connected to the status monitoring device 56 in order to continuously communicate to the status monitoring device 56 information about the state of the capacitive energy store 52 and the storage cells thereof and in this case, in particular, about the charge state of the storage cells 521. The status monitoring device 56 can then in turn signal the information transmitted by the charging control device 57 e.g. to the main processor, in order to keep the main processor up to date about the functionality or performance of the uninterruptible power supply, in order that the main processor can then react accordingly.

The charging control device 57 can both perform a voltage or charging capacitance difference measurement between the individual storage cells 521 of the capacitive energy store 51 in order to ascertain whether all storage cells are functioning correctly or which storage cell is defective, and carry out an absolute measurement in order to determine the total charge state of the capacitive energy store 51. For said absolute measurement, the supply voltage of the charging control device, which is additionally monitored via a comparator 571, is preferably used as reference. Furthermore, the charging control device 57 is supplied with the fault signal by the voltage monitoring device 55 in order then to switch off the charging device 53.

The charging control device 57 furthermore has, for intrinsic protection, an internal monitoring device 572, which, in the case of a fault, if a functional fault occurs in the charging control device, resets the charging control device in order then to start the functional monitoring of the capacitive energy store 52 anew again.

Figure 2:
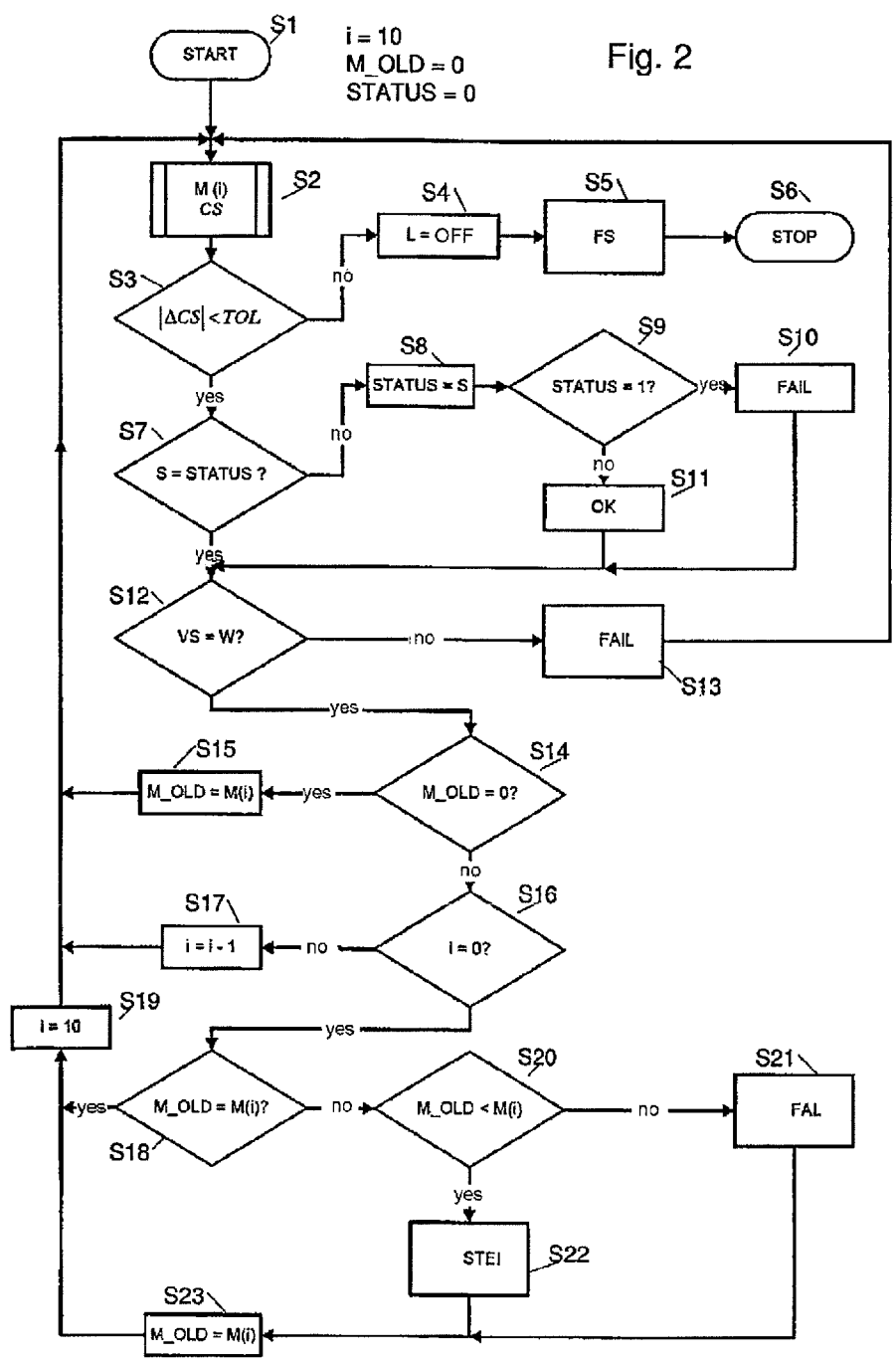
FIG. 2 shows a flowchart of a charging control device for monitoring capacitive storage elements and/or the charging device thereof.

FIG. 2 shows a flowchart for the functional monitoring carried out by the charging control device 57. In this case, a monitoring cycle generally lasts less than 1 millisecond. The internal monitoring device 572 of the charging control device 57 is designed such that a reset of the charging control device 57 is effected if an internal signal that is normally generated regularly has not triggered for a specific time, e.g. 20 ms. Such a reset can be triggered e.g. by a crash or a malfunction of the internal software of the charging control device 57.

Upon the start of the functional monitoring by the charging control device, an initial state is defined in a first step S1. This involves defining the number of measurement loops, i=10 in the exemplary embodiment shown in FIG. 2, and thus the length of the monitoring cycle. Furthermore, an output voltage value (M_OLD=0), is fixed and normal operation of the regular supply of energy (STATUS=0) is assumed.

In step S2, the charging control device determines the total voltage M(i) of the capacitive energy store and the charge CS of the individual storage cells. Step S3 then involves ascertaining, with the aid of a difference calculation, whether the measured charges of the individual storage cells are approximately identical or lies in a predetermined tolerance range TOL. If the result is "no", in step S4 the charging device is switched off and in step S5 a functional fault FAIL of the storage cells is preferably signaled to the status monitoring device. The monitoring is then ended in step S6.

If the result of the difference calculation turns out to be "yes", the status of the regular supply of energy is determined in step S7. For this purpose, the signal which is supplied by the voltage monitoring device and which signals normal operation (S=0) or the collapse of the regular voltage supply (S=1) is compared with the status value stored in the charging device. If the comparison result is "no", in step S8 the status value STATUS stored in the charging control device is set to the status value transferred by the voltage monitoring device. Step S9 then involves checking whether said status value signals a collapse of the regular supply of energy (STATUS=1). If the result is "yes", in step S10 a fault signal FAIL is preferably signaled to the status monitoring device. If the result is "no", by contrast, normal operation OK is indicated in step S11.

After step S10 or step S11, step S12 involves checking, with the aid of the comparator of the charging control device, whether the predetermined supply voltage VS is present. The sequence passes directly to step S12 if the result of the status comparison of the regular supply of energy with the prestored value in step S7 indicates correspondence. If the supply voltage VS of the charging control device does not have the desired value W, this is signaled in step S13 by a signal FAIL preferably to the status monitoring device and the sequence then continues with step S2.

If the desired supply voltage VS of the charging control device is ascertained, step S14 involves checking whether the voltage value M_OLD prestored in the charging control device is at 0, that is to say at the reset initial value. If "yes", the voltage value M_OLD is set to the voltage value M(i) measured in step S2 in step S15 and then the sequence continues with step S2.

If the result is "no", that is to say the voltage value M_OLD stored in the charging control device does not correspond to the reset initial value 0, step S16 involves checking whether the predetermined number of measurement loops has been run through, that is to say the loop variable is 0. If the result is "no", in step S17 the loop variable i is decremented by 1 and the sequence continues with step S2.

If the predetermined number of measurement loops has been run through, that is to say the loop variable i is at 0, step S18 involves comparing whether the stored voltage value M_OLD corresponds to the present measured voltage value M(i). If the comparison result is "yes" which means that the state of the capacitive energy store has not changed, the loop variable i is reset again in step S19 (i=10) and a new monitoring cycle is initiated with step S2.

If the comparison result is "no", that is to say the presently measured voltage value M(i) does not correspond to the prestored voltage value M_OLD of the charging control device, step S20 involves checking whether the present voltage value M(i) is greater than the stored voltage value M_OLD. If the result is "no", step S21 involves signaling preferably to the status monitoring device that the capacitive energy store is discharged. If the result is "yes", i.e. the measured voltage value lies above the stored voltage value, a charging process is indicated in step S22.

After step S21 or step S22, in step S23 the stored voltage value of the charging control device is set to the presently measured voltage value and the sequence then continues with step S19, wherein the number of measurement loops is set again to 10, that is to say reset.

With the functional monitoring scheme of the charging control device as illustrated with reference to FIG. 2, simple and reliable monitoring of the capacitive energy store can be carried out. With the circuit for uninterruptible power supply according to the invention, and with the presented operation of this circuit, provision is made for reliable and rapid-reaction bridging of an interruption in the regular supply of energy for loads. In this case, the circuit can be adapted simply and flexibly to supply voltages, designed holding times and communication protocols of the connected loads to be supplied with energy.

In accordance with an embodiment of the invention, a circuit for uninterruptible power supply is connected between an energy supply and a load, comprises a capacitive energy store. In this case, the energy supply and the capacitive energy store are connected to a changeover switch, which is designed, if a first predetermined voltage drop occurs when a voltage is applied via the energy supply, to change over from supplying the load with energy via the energy supply to supplying the load with energy from the capacitive energy store. The circuit for uninterruptible power supply furthermore comprises a charging device connected between the energy supply and the capacitive energy store and serving for charging the capacitive energy store, which charging device is connected to a charging control device in order to monitor the capacitive energy store and switches off the charging device when a fault is ascertained. Furthermore, a voltage monitoring device is arranged in the circuit for uninterruptible power supply, which voltage monitoring device, if a second predetermined voltage drop occurs when the voltage is applied via the energy supply, said second predetermined voltage drop being less than the first predetermined voltage drop, outputs a fault signal. On the basis of said fault signal of the voltage monitoring device, a discharge device connected to the capacitive energy store then makes available to the changeover switch the energy required for supplying the load by discharging the capacitive energy store.

The circuit for uninterruptible power supply, and the manner in which this power supply is operated, make it possible to use the circuit flexibly and, by means of slight variation in the circuitry or equipment, to perform an adaption to different input and supply voltages, desired holding time periods and different protocols for external communication.

The energy of the capacitive energy store is made available to the changeover switch, which changes over from supplying the load with energy via the energy supply to energy from the capacitive energy store if the voltage applied via the energy supply falls by the first predetermined value, as early as in the front end if the voltage of the energy supply falls below the second value, which is less than the first value, as a result of which the reaction speed of the uninterruptible power supply is significantly shortened and provision is made for the supply of energy to be bridged immediately and without fluctuations after the collapse of the regular supply of energy. This is because the energy of the capacitive energy store of the uninterruptible power supply is already present at the changeover switch at the point in time of the changeover and is not retrieved from the capacitive energy store only after the changeover, which can lead to delays and thus undesired fluctuations in the supply of energy during changeover.

The circuit for uninterruptible power supply is furthermore distinguished by a small space requirement and hence the possibility of direct integration on a motherboard together with a power supply unit and the main processor. As a result of the control according to the invention of the charging and discharging process of the capacitive energy store, in particular as a result of the ongoing monitoring of the charging process by the evaluation of the voltage of the capacitive energy store, provision is made for reliable functioning and a long lifetime of the capacitive energy store.

In accordance with a further embodiment, the capacitive energy store is composed of a plurality of storage cells, wherein a compensation circuit for uniform charging is connected upstream of the storage cells, and the charging control device compares the voltage of the individual storage cells in order to switch off the charging device when an excessively great deviation is ascertained. This procedure ensures that the same voltage is applied to all the capacitive storage elements and the storage elements are thus charged to their full capacity. In this case, the charging process is monitored and switched off if great drifting apart of the voltage of the individual capacitive storage elements occurs, whereby damage to the capacitive storage elements is avoided.

In accordance with a further embodiment, the charging control device is designed such that individual storage cells can be switched on or off. As a result, there is the possibility of exchanging the capacitive storage elements, e.g. when damage has occurred here, in the course of operation or retrofitting the uninterruptible power supply with further storage elements for increasing the storage capability and hence the holding time.

In accordance with a further embodiment, the charging control device is designed such that it monitors the total charge state of the capacitive energy store of the uninterruptible power supply continuously by comparing the voltage of the capacitive energy stores with a supply voltage of the charging control device. The uninterruptible power supply can thus continuously output information about the state of the storage elements or about the holding time duration. The procedure of comparing the voltage of the capacitive storage elements with the supply voltage of the charging control device as reference voltage provides for simple and reliable evaluation.

In accordance with a further embodiment, the charging device has a current and voltage limiter and preferably also a power consumption limiter. This ensures a gentle charging process and hence a long lifetime of the capacitive energy store. The limiting of the power consumption furthermore reliably protects the energy supply against overload and hence the load connected downstream against undesirable fluctuations in the supply of energy.

In accordance with a further embodiment, the charging device has a blocking device for preventing a feedback of energy into the energy supply. As a result, an accelerated charging process is achieved since charging losses as a result of the feedback of energy from the capacitive energy store into the energy supply are avoided.

In accordance with a further embodiment, the discharge device is embodied as a voltage converter for adapting the voltage supplied by the capacitive energy store to the supply voltage of the load. This enables the uninterruptible power supply to be adapted simply and rapidly to the required supply voltage of the load connected downstream. It is furthermore preferred that the discharge device, in normal operation, is in a standby mode or off mode, which, when a fault signal of the voltage monitoring device is applied, that is to say if the voltage applied via the energy supply falls by the first value, which is less than the threshold value of the changeover switch, to switch up into an active mode. This circuit design ensures a fast reaction of the discharge device to an interruption of the regular supply of energy and hence a fast application of the energy of the capacitive energy stores to the changeover switch. The standby mode or off mode furthermore ensures that in normal operation, with a functioning regular supply of energy, only little energy flows away from the capacitive energy store, whereby premature discharging and, as a result, an increased power demand as a result of unnecessary charging processes are prevented. At the same time, a lengthening of the lifetime of the capacitive energy store is thus also achieved since the storage capability of capacitive energy stores generally decreases after a specific number of charging and discharging processes.

In accordance with a further embodiment, the changeover switch has a blocking device for preventing a feedback of energy from the capacitive energy store into the energy supply. A rapid discharging of the capacitive energy store is thereby prevented.

Uninterruptible power supplies are used to ensure the supply of energy for critical electrical loads in the case of disturbances in the electrical power grid. Thus, e.g. in the case of computer systems, in particular for controlling machines and installations in the context of automation technology, uninterruptible power supplies are provided in order to avoid data losses in the event of interruptions in the power supply. Even a power failure in the milliseconds range in the case of computer systems can lead to a crash of the computer system. In order, in the event of a power failure, to give computer systems enough time for a controlled shutdown in which important computer data can be saved in nonvolatile read only memories, the supply of energy is maintained in a manner free of fluctuations with the aid of an uninterruptible power supply.

The preceding description describes exemplary embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

The invention claimed is:

1. A circuit for uninterruptible power supply, which can be connected to an energy supply and a load, and comprises
   a capacitive energy store connected to the energy supply,
   a changeover switch connected to the energy supply and the capacitive energy store, said changeover switch being designed, if a first predetermined voltage drop occurs when a voltage is applied via the energy supply, to change over from supplying the load with energy via the energy supply to supplying the load with energy from the capacitive energy store,
   a charging device connected between the energy supply and the capacitive energy store and serving for charging the capacitive energy store,
   a charging control device connected to the capacitive energy store and the charging device, said charging control device being designed to monitor the capacitive energy store by evaluating a voltage of the capacitive energy store and to switch off the charging device when a fault is ascertained,
   a voltage monitoring device connected to the energy supply and serving for determining and signaling in the form of a fault signal if a second predetermined voltage drop occurs when the voltage is applied via the energy supply, said second predetermined voltage drop being less than the first predetermined voltage drop and
   a discharge device connected between the capacitive energy store and the changeover switch and connected to the voltage monitoring device, said discharge device being designed, when the fault signal of the voltage monitoring device is present, to be switched into an active mode, wherein in the active mode the discharge device applies the energy from the capacitive energy store to the changeover switch to make available to the changeover switch the energy required for supplying the load by means of discharging the capacitive energy store.

2. The circuit as claimed in claim 1, wherein the capacitive energy store comprises a plurality of storage cells and a compensation circuit connected between the charging device and storage cells and serving for uniformly charging the storage cells, wherein the charging control device compares the voltages of the individual storage elements in order to switch off the charging device when an excessively great deviation is ascertained.

3. The circuit as claimed in claim 2, wherein an exchange circuit is provided for switching storage cells on or off.

4. The circuit as claimed in claim 1, wherein the charging control device compares the voltage of the capacitive energy store with a supply voltage of the charging control device in order to determine the charge state of the capacitive energy store.

5. The circuit as claimed in claim 1, wherein the charging device has a current and voltage limiter and/or a power consumption limiter.

6. The circuit as claimed in claim 1, wherein the charging device has a blocking device for preventing a feedback of energy into the energy supply.

7. The circuit as claimed in claim 1, wherein the discharge device is designed as a voltage converter for adapting the voltage supplied by the capacitive energy store to the supply voltage of the load.

8. The circuit as claimed in claim 1, wherein the discharge device is designed, when the fault signal of the voltage monitoring device is present, to change from a standby mode or an off mode into the active mode.

9. The circuit as claimed in claim 1, wherein the changeover switch has a blocking device for preventing a supply of energy from the capacitive energy store into the energy supply.

10. The circuit as claimed in claim 1, comprising a status monitoring device connected to the voltage monitoring device, said status monitoring device being designed, when the fault signal of the voltage monitoring device is present, to switch off components of the load and/or to provide information about the circuit.

11. The circuit as claimed in claim 1, arranged between a power supply unit and a main processor, wherein the power supply unit serves as the energy supply and the main processor serves as the load.

12. A method for the uninterruptible power supply of a load,
    wherein a capacitive energy store connected to an energy supply is charged,
    wherein the charging of the capacitive energy store is monitored by the evaluation of a voltage of the capacitive energy store and is terminated when a fault is ascertained,
    wherein, if a first predetermined voltage drop occurs when a voltage is applied via the energy supply, a discharge device is switched to an active mode, wherein in the active mode the discharge device applies energy from the capacitive energy store to a changeover switch, and
    wherein, if a second predetermined voltage drop occurs when the voltage is applied via the energy supply, said second predetermined voltage drop being greater than the first predetermined voltage drop, the changeover switch changes over from supplying a load with energy via the energy supply to supplying the load with energy from the capacitive energy store.

13. The method as claimed in claim 12, wherein the capacitive energy store has a plurality of storage cells, wherein the voltages of the individual storage elements are compared during charging in order to switch off the charging process when an excessively great deviation is ascertained.

14. The method as claimed in claim 13, wherein storage cells can be switched on or off.

15. The method as claimed in claim 12, wherein, if the first predetermined voltage drop occurs in the voltage applied via the energy supply, components of the load are switched off and/or information about the energy supply from the capacitive energy store is made available.

16. A motherboard comprising a power supply unit, a main processor and a circuit arranged between the power supply unit and the main processor, said circuit comprising
   a capacitive energy store,
   a changeover switch connectable to the energy supply unit and the main processor, said changeover switch being connected to the capacitive energy store and designed to change over from supplying the main processor with energy via the energy supply unit to supplying the main processor with energy from the capacitive energy store if a first predetermined voltage drop occurs when a voltage is applied via the energy supply unit,
   a charging device connectable to the energy supply unit, said charging device being connected to the capacitive energy store and designed to charge the capacitive energy store,
   a charging control device connected to the capacitive energy store and the charging device, said charging control device being designed to monitor the capacitive energy store by evaluating a voltage of the capacitive energy store and to switch off the charging device when a fault is ascertained,
   a voltage monitoring device connectable to the energy supply unit, said voltage monitoring device being designed to determine and signal in the form of a fault signal if a second predetermined voltage drop occurs when the voltage is applied via the energy supply unit, said second predetermined voltage drop being less than the first predetermined voltage drop and
   a discharge device connected between the capacitive energy store and the changeover switch and connected to the voltage monitoring device, said discharge device being designed, when the fault signal of the voltage monitoring device is present, to change from a standby mode or an off mode into an active mode, wherein in the active mode the discharge device applies the energy from the capacitive energy store to the changeover switch in order to make available to the changeover switch the energy required for supplying the main processor by means of discharging the capacitive energy store.

17. The circuit as claimed in claim 16, wherein the capacitive energy store comprises a plurality of storage cells and a compensation circuit connected between the charging device and storage cells and serving for uniformly charging the storage cells, wherein the charging control device compares the voltages of the individual storage elements in order to switch off the charging device when an excessively great deviation is ascertained.

18. The circuit as claimed in claim 17, wherein an exchange circuit is provided for switching storage cells on or off.

19. The circuit as claimed in claim 16, wherein the charging control device compares the voltage of the capacitive energy store with a supply voltage of the charging control device in order to determine the charge state of the capacitive energy store.

20. The circuit as claimed in claim 16, wherein the charging device has a current and voltage limiter and/or a power consumption limiter.

21. The circuit as claimed in claim 16, wherein the charging device has a blocking device for preventing a feedback of energy into the energy supply unit.

22. The circuit as claimed in claim 16, wherein the discharge device is designed as a voltage converter for adapting the voltage supplied by the capacitive energy store to the supply voltage of the main processor.

23. The circuit as claimed in claim 16, wherein the changeover switch has a blocking device for preventing a supply of energy from the capacitive energy store into the energy supply unit.

24. The circuit as claimed in claim 16, comprising a status monitoring device connected to the voltage monitoring device, said status monitoring device being designed, when the fault signal of the voltage monitoring device is present, to switch off components of the main processor and/or to provide information about the circuit.

\* \* \* \* \*